US006721307B1

(12) United States Patent
Kim

(10) Patent No.: US 6,721,307 B1
(45) Date of Patent: Apr. 13, 2004

(54) DEVICE FOR PROCESSING VOICE AND FACSIMILE DATA IN A REMOTE ACCESS SERVER

(75) Inventor: Joung-Gue Kim, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 752 days.

(21) Appl. No.: 09/625,936

(22) Filed: Jul. 26, 2000

(30) Foreign Application Priority Data

Aug. 28, 1999 (KR) ........................................ 1999-36160

(51) Int. Cl.$^7$ .............................................. H04L 12/66
(52) U.S. Cl. ........................ 370/352; 370/355; 370/356
(58) Field of Search ................................ 370/351, 474, 370/352, 353, 354, 355, 356, 389, 465, 466, 471; 379/88.13, 88.17, 93.05

(56) References Cited

U.S. PATENT DOCUMENTS

| 5,577,105 A | * 11/1996 | Baum et al. | 379/93.05 |
| 5,742,596 A | * 4/1998 | Baratz et al. | 370/356 |
| 5,892,764 A | * 4/1999 | Riemann et al. | 370/401 |
| 5,912,888 A | * 6/1999 | Walsh et al. | 370/355 |

\* cited by examiner

Primary Examiner—Frank Duong
Assistant Examiner—Melanie Jagannathan
(74) Attorney, Agent, or Firm—Cha & Reiter, L.L.C.

(57) ABSTRACT

A device for processing voice and data in a remote access server which provides a voice and facsimile data transmission service over the Internet. The device comprises a first interface for interfacing with a public network; a second interface for interfacing with the Internet; and, a remote access server connected to the first and second interfaces for transmitting voice and facsimile data received from the first interface to the Internet via the second interface and for transmitting voice and facsimile data received from the second interface to the public network via the first interface. The remote access server includes a plurality of voice/facsimile codecs each having a plurality of channels connected to the first interface for encoding and decoding voice and facsimile data provided from the first and second interface; a codec controller for controlling the associated voice/facsimile codecs and for controlling the generation of an interrupt in the corresponding voice/facsimile codec according to whether to process the voice and facsimile data received through the channels; a slave processor for providing the voice and facsimile data to a specified channel, for outputting the voice and facsimile data encoded by the voice/facsimile codecs upon receipt of the interrupt, for decoding the voice and facsimile data provided from the second interface and outputting the decoded voice and facsimile data to the first interface; and, a master processor for communicating with a system operator and for managing the slave processors.

19 Claims, 4 Drawing Sheets

DEVICE FOR PROCESSING VOICE AND FACSIMILE DATA IN A REMOTE ACCESS SERVER

CLAIM OF PRIORITY

This application claims priority and all benefits accruing under 35 U.S.C. Section 119 to an application entitled "Device for Processing Voice and Facsimile Data in Remote Access Server" filed in the Korean Industrial Property Office on Aug. 28, 1999 and there duly assigned Serial No. 99-36160.

BACKGROUND OF THE INVENTION

1. Field of the Invention

The present invention relates generally to a communication system. More particularly, the present invention relates to a remote access server (RAS) for remotely processing voice and data information.

2. Description of the Related Art

FIG. 1 illustrates a network linked to a remote access server which supports the processing of voice and data information over the Internet. Remote users can dial into the remote access server over the public switched telephone network to get direct links to the Internet from a remote site, just as if they were connected locally. As shown in FIG. 1, the remote access servers 2 and 20 are coupled to different network types to provide Internet users with more economical services for the conventional long-distance call services, the facsimile transmission services, and other additional services. The remote access servers 2 and 20 are connected to the Private Automatic Branch Exchanges (PABXs) 4 and 22, the Public Switched Telephone Network/Integrated Service Digital Network (PSTN/ISDN) 6, the PSTN 24, and the routers 8 and 26, respectively. The respective routers are connected to the Internet 18 via the Ethernet connection. The PABX 4 is connected to the facsimile (FAX) 10, the telephone 12, and the PSTN/ISDN 6, and the PABX 22 is connected to the PSTN 24. The router 8 is connected to a server 14, a personal computer (PC) 16, and the router 26 is connected to a server 30 and a PC 28. The router 8 is connected to the router 26 via the Internet 18. The remote access servers 2 and 20 transmit voice and facsimile data from a public network, such as the PSTN/ISDN 6 and the PSTN 24, to another public network.

FIG. 2 depicts a module for processing voice and data information of the remote access servers 2 and 20 as illustrated in FIG. 1. As shown in FIG. 2, the module includes a system main controller interface 34 connected to a system main controller 32; a Main Processing Unit (MPU) 36; four voice/facsimile codecs 38; a memory 40, Ethernet 42; a decoder 44; a glue logic 46; and, a PCM (Pulse Code Modulation) interface 48 connected to an E1 trunk interface 50. The system main controller interface 34 exchanges the operating state, the access information of the voice/data processing module, and the system configuration information. The system main controller 34 also downloads a software application for the system operation. The memory 40 is comprised of a flash memory for storing programs, a DRAM (Dynamic Random Access Memory), and an SRAM (Static Random Access Memory). The Ethernet 42 processes an Ethernet protocol and enables access to an IP (Internet Protocol) network using 10-base T. The decoder 44 and the glue logic 46 perform address decoding to enable the MPU 36 to control each peripheral part thereof. The PCM interface 48 exchanges voice data through a time switch of the system and a PCM highway to provide voice signal to the voice/facsimile codecs 38.

In the module as shown in FIG. 2, a single MPU 36 performs the protocol operation for the voice and data processing function in a local area network (LAN), the signaling processing function with the PSTN, and the IPC (Inter-Processor Communication) processing function with the system main controller 32. The MPU 36 has a processing capability of 4.5 MIPs (Million Instructions Per second) with the system clock of 25 MHz. Although such a module is implemented to process voice and facsimile data of approximately 16 channels, it experiences problems in processing all 16 channels. The factors to be considered to determine the capability of codecs 38 to process all 16 channels depends on the design specification and its required processing time of the codecs, as set forth under the ITU (International Telecommunications Union-Telecommunications standard sector) Recommendations—G.723.1 (6.3 Kbps), G726 (32 Kbps) and G.729 (8 Kbps). That is, for enabling the four voice/facsimile codecs 38 to process 16 channels, the required time to process one channel is 30 ms for G.723.1 codec and 0.75 ms for G.711 codec. The interrupt processing time of the voice/facsimile codes is 30 ms and the protocol processing time is 10 ms. However, if these conditions are not met, undue delays may occur in the performance of the server limited by its processing ability, thus degrading the voice quality. As the voice data transmission is very sensitive to the delay, the MPU must perform without adding undue delays as it forwards data packets.

Generally, a network delay is divided into a transmission delay and a processing delay. When the sum of the transmission delay and the processing delay is in the range of about 150–200 ms, most users will be able to enjoy data and voice service over the Internet.

Currently, the conventional voice/facsimile codecs 38, as depicted in FIG. 2 can not process all 16 channels (64 Kbps per channel) due to its limited processing capability of approximately 4.5 MIPs. It also processes the interrupt service routine for encoding the voice and facsimile data received from the E1 trunk interface 50 and the PCM interface 48. As a result, the conventional module is limited to perform voice and facsimile data only up to 8 channels.

SUMMARY OF THE INVENTION

It is, therefore, an object of the present invention to provide a device capable of servicing a maximum number of subscriber ports in a network system and to provide a voice and facsimile subscriber module for a remote access server to efficiently operate the system.

To achieve the above object, there is provided a device for processing voice and data in a remote access server which provides a voice and facsimile data transmission service over the Internet. The device includes a first interface for interfacing with a public network; a second interface for interfacing with the Internet; and a remote access server coupled to the first and the second interfaces for transmitting voice and facsimile data received from the first interface to the Internet via the second interface, and for transmitting voice and facsimile data received from the second interface to the public network via the first interface. The remote access server includes a plurality of voice/facsimile codecs, each having a plurality of channels connected to the first interface for encoding and decoding voice and facsimile data provided from the first interface and the second interface; a codec controller for controlling the associated voice/ facsimile codecs and for controlling the generation of an interrupt in the corresponding voice/facsimile codec in response to a specific protocol information to process the voice and facsimile data received through the channels; a slave processor for providing the voice and facsimile data to one of the specified channels for outputting the voice and facsimile data encoded by voice/facsimile codecs upon receipt of the interrupt, and for decoding the voice and facsimile data provided from the second interface and outputting the decoded voice and facsimile data to the first interface; and, a master processor for communicating with a system operator and for managing the slave processor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. For the purpose of clarity, well-known functions or constructions are not described in detail as they would obscure the invention in unnecessary detail.

Figure 1:
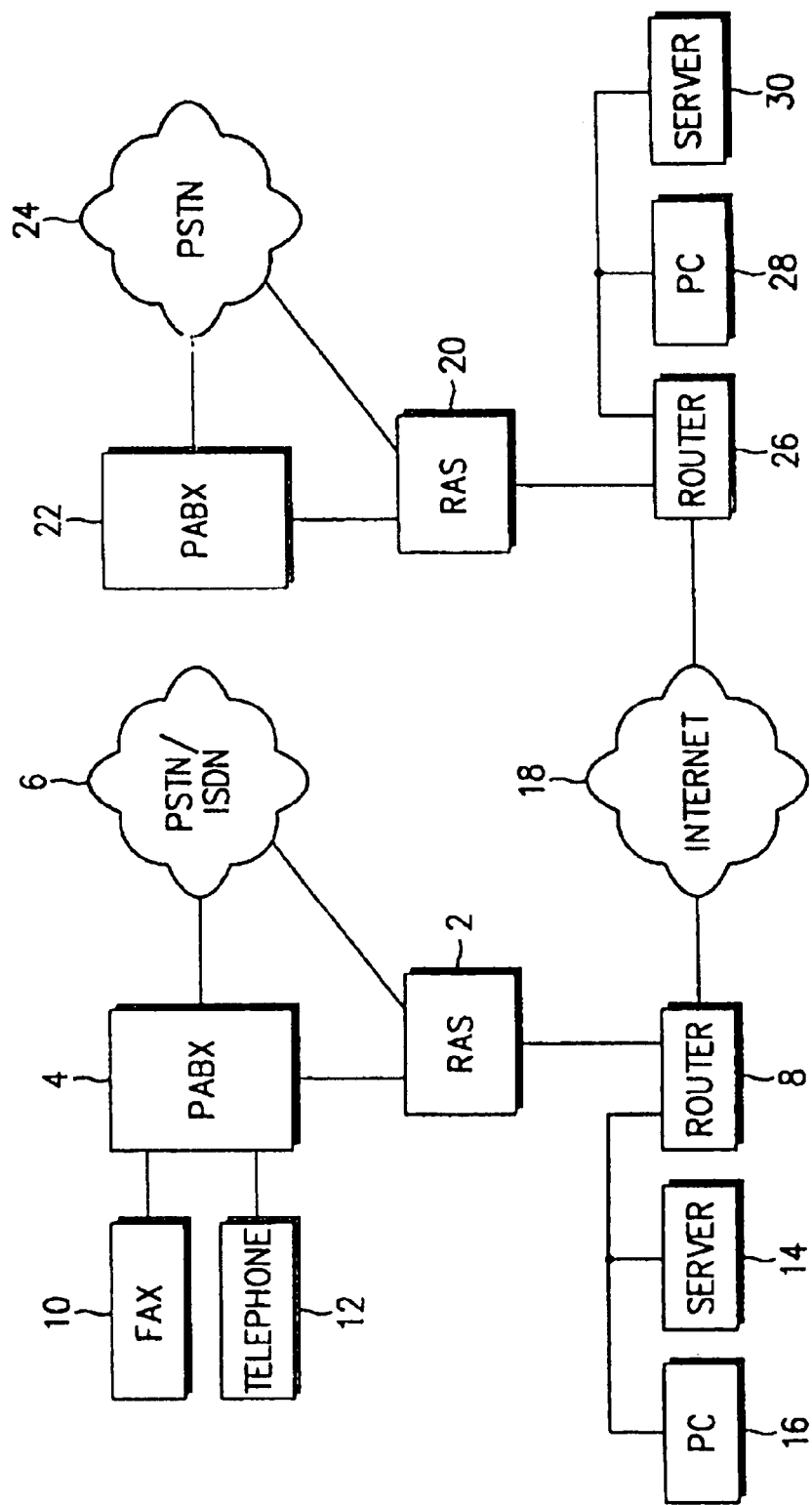
FIG. 1 is a diagram illustrating the network structure of a remote access server device for processing voice and data over the Internet.
Figure 2:
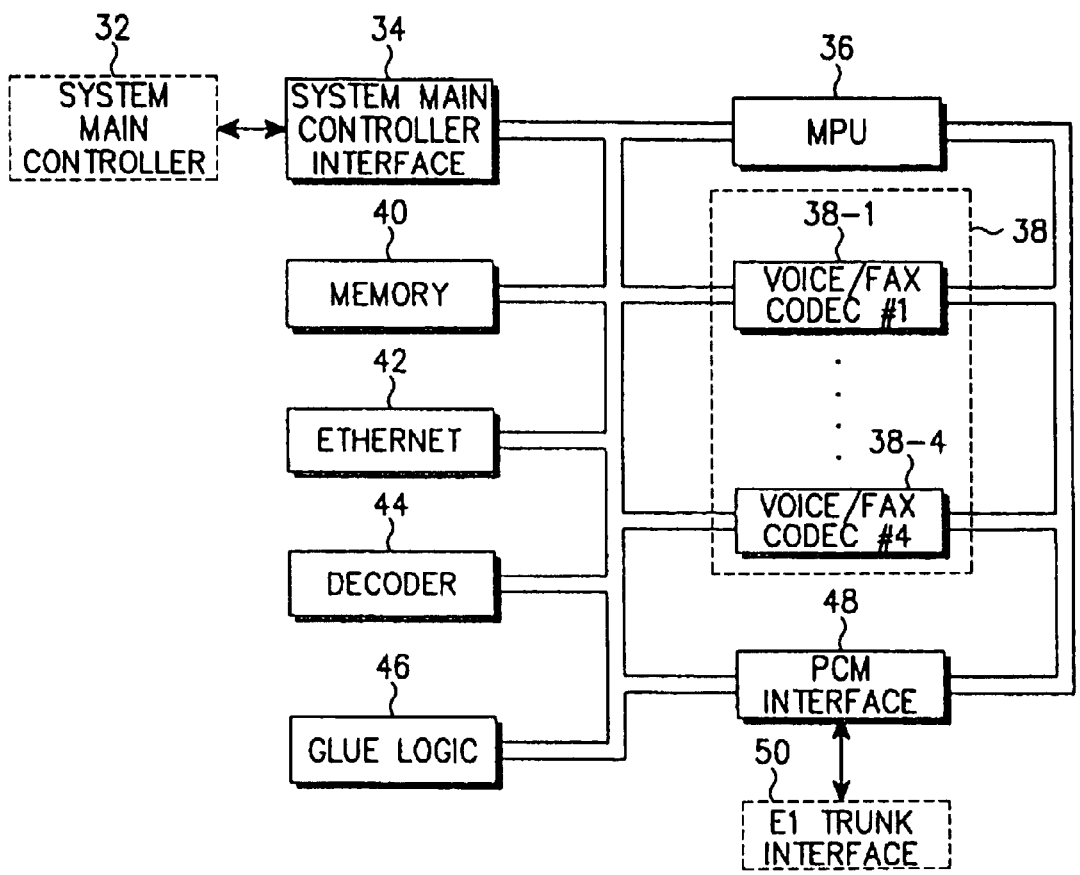
FIG. 2 is a diagram illustrating a module for processing voice and data in the conventional remote access server.
Figure 3:
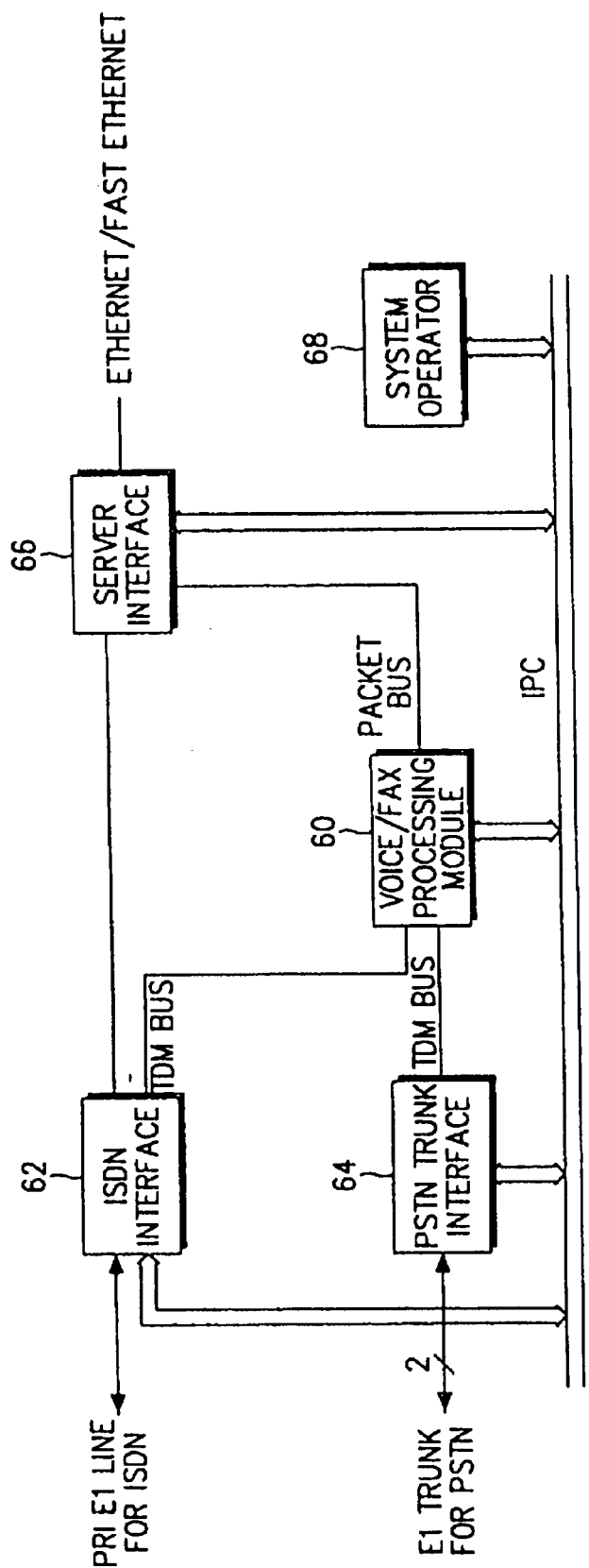
FIG. 3 is a diagram illustrating a module for processing voice and data in a remote access server according to the embodiment of the present invention; and, FIG. 4 is a detailed block diagram illustrating the voice/facsimile processing module of FIG. 3.

FIG. 3 shows a module for processing voice and data in the respective remote access servers 2 and 20 of FIG. 1. Referring to FIG. 3, a voice/facsimile processing module 60 is coupled to an ISDN interface 62 via a Time Division Multiplexing (TDM) bus, and the ISDN interface 62 in turn is connected to a Primary Rate Interface (PRI) E1 line for the ISDN. The voice/facsimile processing module 60 is coupled to a PSTN trunk interface 64 via the TDM bus, and the PSTN trunk interface 64 in turn is connected to two E1 trunks for the PSTN. Moreover, the voice/facsimile processing module 60 is coupled to a server interface 66 via a packet bus, and the server interface 66 in turn is connected to the Ethernet/fast Ethernet via a packet bus. Furthermore, the voice/facsimile processing module 60 is coupled to a system operator 68 via an Inter-Processor Communication (IPC) channel.

The inter-working relationship of the present invention can be described in relation to the network system shown in FIG. 1. Accordingly, the PRI E1 line for the ISDN connected to the ISDN interface 62 is connected to the ISDN 6 of FIG. 1. The ISDN interface 62 performs the ISDN interfacing between the ISDN 6 and the voice/facsimile processing module 60. The PSTN E1 trunks connected to the PSTN interface 64 are connected to the respective PSTNs 6 and 24 of FIG. 1, and the PSTN trunk interface 64 performs the PSTN interfacing between the voice/facsimile processing module 60 and the PSTNs 6 and 24. The Ethernet/fast Ethernet connected to the server interface 66 is connected to the respective routers 8 and 26 of FIG. 1, and the server interface 66 performs the Ethernet/fast Ethernet interfacing between the voice/facsimile processing module 60 and the routers 8 and 26.

According to the present invention, the 64 Kbps voice or facsimile data received at the voice/facsimile processing module 60 through the ISDN PRI E1 line or the PSTN E1 trunks is encoded and packetized by the voice/facsimile processing module 60. The packetized voice and facsimile data is provided to the server interface 66 via the packet bus. The server interface 66 performs the Internet Protocol (IP) processing on the packetized voice and facsimile data, so that the packetized voice and facsimile data can be serviced over the Internet or the Intranet. The processed data is provided to the routers 8 and 26 of FIG. 1.

Figure 4:
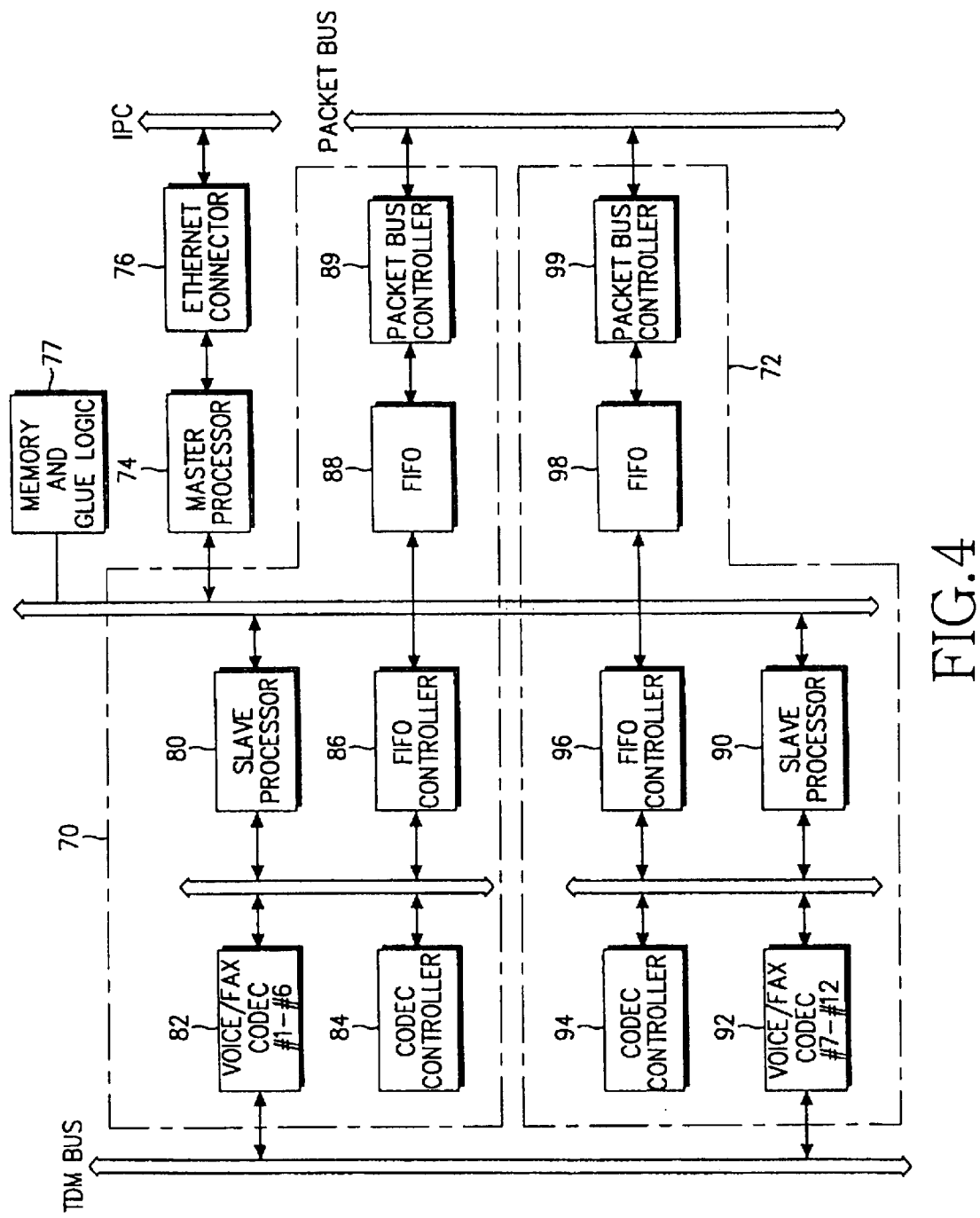

FIG. 4 shows a detailed block diagram of the voice/facsimile processing module 60 shown in FIG. 3. According to the present invention, the voice/facsimile processing module 60 includes one master processor 74 and two slave modules 70 and 72. The slave module 70 (72) includes a slave processors 80 (90); a voice/facsimile codec 82 (92) having 6 voice and facsimile codec chips; a codec controller 84 (94), a FIFO (First-In, First-Out) controller 86 (96); a FIFO 88 (98); and, a packet bus controller 89 (99).

As shown in FIG. 4, the voice/facsimile processing module 60 according to the present invention includes one master process 74 and two slave processors 80 and 90 to solve the problem associated with the conventional module in that the voice and facsimile data cannot be properly processed due to its limited capability of the processor. Thus, it is preferable that the two slave processors 80 and 90 with a processing speed of about 60 MIPs be implemented which are about 10 times faster than the existing processing capability of 4.5 MIPs.

Function of Slave Modules

Each of the slave modules 70 and 72 includes six voice/facsimile codecs 82 (92), and each slave module has a capability of processing 30 channels. The performance of enabling six voice/facsimile codecs to process 30 channels depends on the processing time. The required time to process per channel according to the type of the codec is 30 ms (for G.723.1 codec) and 0.75 ms (for G.711 codec). The interrupt processing time of the voice/facsimile codec is 30 ms and the protocol processing time is 10 ms.

The slave processors 80 and 90, according to the present invention, are implemented to have a processing speed, which is 10 times faster than the conventional processor of the prior art. Thus, it is possible to process 80 channels according to the configuration of the present invention within the same duration of processing time in which the conventional processor is only able to process 8 channels. Accordingly, it is possible to prevent the processing delay experienced in the prior art by enabling each E1 trunk to process voice/facsimile data with 30 channels and with faster processors, thus preventing the degradation of the voice quality associated with the inability to process data packets with undue delays.

Function of Master Processor

The master processor 74 initializes the voice/facsimile codecs 82 and 92, exchanges information with the slave processors 80 and 90 to send a report to the system operator 68, and transmits a command from the system operator 68 to the slave processors 80 and 90. Moreover, the master processor 74 sends a report to the system operator 68 and performs the IPC access through the Ethernet interface 76 and the IPC channel. The master processor 74 also receives order/command from the system operator 68 and performs the debugging operation.

Function of Slave Processors

The slave processors 80 and 90 of the respective slave modules 70 and 72 have a protocol processing function for implementing a Voice over Internet Protocol(VoIP) function, performs the Q.931 and H234 signaling protocol processing for interworking with the IP network, and performs the H.323 call signaling protocol processing which includes the remote access service. In addition, the slave processors 80 and 90 perform the assignment, the management and the deletion of the IP address. Further, when the slave processors 80 and 90 generate an interrupt in the corresponding codec chip that has suspending data, the master processor 74 reads the read or write register of the corresponding chip and processes the read data accordingly. According to the embodiment of the present invention, the sequential method (or pooling method) and the interrupt method are used together to process the data received through 30 channels per each slave processor 80 and 90. Normally, when interrupts happen continuously in a particular CODEC chip out of six CODEC chips (80, 90), the data in that particular CODEC chip is processed continuously. As a result, processing the interrupt informing operation of data in other chips is delayed. However, the present invention processes an interrupt in a specific chip, then checks other chips using the sequential check method (or pooling method) to process the interrupt in other chips, instead of processing continuously in one chip. Thus, by marking data interrupts in six CODEC chips into the interrupt processing logic of the CODEC controller (84, 94) through a means of interrupt masking, the delay of processing interrupts can be reduced. As a result, it is possible to minimize the data transmission delay, which helps to prevent the performance degradation.

Function of Voice/facsimile Codecs

As illustrated in FIG. 4, the voice/facsimile codecs 82 and 92 are assigned with 6 chips per slave module. Thus, the voice/facsimile codec 82 includes the first six voice/facsimile codec chips, and the voice/facsimile codec 92 includes the next six codec chips. As each chip of the voice/facsimile codecs 82 and 92 provides 5 voice/data channels, it is possible to process 30 (=6×5) voice/facsimile data channels per slave module.

The voice/facsimile codecs 82 and 92 include a TDM interface, which is connected to the ISDN interface 62 and the PSTN trunk interface 64 through a TDM bus. The voice/facsimile codecs 82 and 92 encode the analog voice and the facsimile data received through the TDM interface, convert the coded data into a digital bit stream in form of packet data, and provides the converted packet data to the FIFO controllers 86 and 96, respectively. In reverse, the voice/facsimile codecs 82 and 92 convert the digital bit stream in the form of packet data received from the FIFO controllers 86 and 96 to analog voice and facsimile data and provide the converted packet data to the TDM interface.

The voice/facsimile codecs 82 and 92 are designed according to one of the ITU-T (International Telecommunications Union-Telecommunications standard sector) Recommendations G.723.1 (6.3 Kbps), G726 (32 Kbps) and G.729 (8 Kbps). The voice/facsimile codecs 82 and 92 thus perform the encoding and the decoding of voice and facsimile data according to the specified encoding method.

Function of Codes Controllers

The respective codec controllers 84 and 94 transmit control information to be transmitted from the respective voice/facsimile codec chips 82 and 92 of the slave modules 70 and 72 to the master processor 74, and also transmit data existence information to the corresponding slave processors 80 and 90. Further, the codec controllers 84 and 94 control the interrupt signal generated in the respective codec chips. Thus, it is possible to know whether the respective codecs are in an active state through the control information controlled by the codec controllers 84 and 94 for the voice/facsimile codes 82 and 92 as well as the information transmitted from each codec chip to the master processor 74 through the corresponding slave processors 80 and 90. Accordingly, the master processor 74 can activate or reset each codec separately.

Function of FIFO Controllers

The respective FIFO controllers 86 and 96 store the voice and the facsimile data transmitted from the voice/facsimile codecs 84 and 94 in the FIFOs 88 and 98 during a write mode operation. Similarly, the FIFO controllers 86 and 96 read the voice and the facsimile data stored in the FIFOs 88 and 98 and provide the read data to the voice/facsimile codecs 84 and 94 during a read mode operation.

The FIFOs 88 and 98 sequentially store and transmit voice and the facsimile data under the control of the FIFO controllers 86 and 96. The packet bus controllers 89 and 99 transmit the voice and the facsimile data provided from the FIFOs 88 and 98 to the server interface 66 via the packet bus. In addition, the packet bus controllers 89 and 99 process the voice and the facsimile data received through the packet bus and transmit the processed data to the FIFOs 88 and 98.

The memory and the glue logic 77 generates various control signals required when the master processor 74 controls each peripheral block of the slave modules 70 and 72 and serves as an address decoder. In addition, the memory and glue logic 77 includes a memory for storing data, a memory for a booster, and a memory for storing the Network Management System (NMS) data.

Now, a detailed description of the present invention will be made with reference to FIGS. 3 and 4.

In FIG. 4, as each voice/facsimile codec chip provides 5 independent voice/facsimile data channels, the slave modules 70 and 72 can each process 30 channels with a data rate of 64 Kbps, i.e., one E1 (2.048 Mbps) signal. The voice/facsimile processing module 60 of FIG. 3 is comprised of two slave modules 70 and 72, thus can process voice and the facsimile data of 60 channels.

When the voice and the facsimile data are provided to the voice/facsimile processing module 60 over the 30 channels, each having a data rate of 64 Kbps, through the TDM bus connected to the slave modules 70 and 72, the slave processors 80 and 90 determine which channel is presently available. To this end, the slave processors 80 and 90, having the status information for the respective 5 channels of the respective 6 chips of the voice/facsimile codecs 82 and 92, can determine which channel is presently available. Based on such determination, the slave processors 80 and 90 issue an order for connecting the voice and the facsimile data to a specific chip of the voice/facsimile codecs 82 and 92, with an available channel. Upon receipt of the order from the slave processors 80 and 92, the corresponding chip (or chips) of the voice/facsimile codec 82 encode the voice and the facsimile data received through the available channel.

After completing the encoding of the voice and facsimile data, a corresponding chip of the voice/facsimile codec 82 sets the read state register to a read state, generates an interrupt signal indicating the completion of data encoding, and provides the generated interrupt signal to the slave processors 80 and 90 under the control of codec controllers 84 and 94. The codec controllers 84 and 94 store the interrupt vector value indicating from which chip the interrupt is generated, along with the read state value of the internal read state register of the interrupt-generated codec chip. Upon receipt of at least one interrupt signal generated in the 6 codec chips, the slave processors 80 and 90 access the interrupt-generated codec chip using the pooling method to read the processed voice and facsimile data, and transmit the read data to the FIFO controllers 86 and 96.

As described above, under the control of the codec controllers 84 and 94, the respective chips of the voice/facsimile codes 82 and 92 of the slave modules 70 and 72 generate an interrupt signal to the corresponding slave processors 80 and 90 according to the control information and transmit the data existence information to the master processor 74. Therefore, it is possible to minimize the performance degradation according to a transmission delay of the data received over the 30 channels.

The FIFO controllers 86 and 96 sequentially store the voice and the facsimile data transmitted from the voice/facsimile codecs 84 and 94 in the FIFOs 88 and 98. The slave processors 80 and 90 have an operating frequency of 40 MHz, while the packet bus controllers 89 and 99 have an operating frequency of 25 MHz. Therefore, the FIFO controllers 80 and 90 and the FIFOs 88 and 98 are used for matching the data rate therebetween. The voice and facsimile data transmitted from the FIFOs 88 and 98 are packet-controlled by the packet bus controllers 89 and 99 and output to the server interface 66 of FIG. 3 through the packet bus. The packet bus controllers 89 and 99 packetize the data generated in the respective modules connected to the packet bus of FIG. 3, and transmit the packetized data to the server interface 66. Moreover, the packet bus controllers 89 and 99 transmit the packet data received from the server interface 66 through the Ethernet to the respective modules. The master of the packet bus is the sever interface 66 and the slave of the packet bus is the voice/facsimile processing module 60. The server interface 66, which is the master of the packet bus, receives various bus request signals (e.g., packet available signals) generated from the respective slave devices, i.e., the voice/facsimile processing module 60 and the ISDN interface 62, and selects one of the packet outputs from the respective slave devices on a round robin basis. Upon receipt of the available packet signal from the server interface 66, the voice/facsimile processing module 60 reads the oldest packet out of the voice/facsimile data packets stored in the FIFOs 88 and 98 and transmits the read packet to the server interface 66. In this process, a packet boundary is defined by using the SOP (Start Of Packet) and the EOP (End Of Packet).

Meanwhile, the voice and the facsimile data transmitted from the server interface 66 is provided to the packet bus controllers 89 and 99 in the voice/facsimile processing module 60 through the packet bus. The voice and facsimile data packet transmitted from the server interface 66 can be received through a negotiation with the voice/facsimile processing module 60, which is a slave of the packet bus. When the voice/facsimile processing module 60 stores the received packet in the FIFOs 88 and 98 and informs the FIFO controllers 86 and 96 of the received packet, the FIFO controllers 86 and 96 generate an interrupt to the corresponding slave processors 80 and 90, thereby providing an environment in which the packets stored in the FIFOs 88 and 98 can be read. Upon power-on or when the packet bus controllers 89 and 99 are reset, the packet bus controllers 89 and 99 initialize the receiving FIFO threshold of the FIFOs 88 and 98, and the FIFO controllers 86 and 96 initialize the transmission FIFO threshold of the FIFOs 88 and 98. The FIFO controllers 86 and 96 have an operating frequency of 25 MHz, and the slave processors 80 and 90 have an operating frequency of 40 MHz. Thus, the FIFO controllers 86 and 96 and the FIFOs 88 and 98 serve as an interface for the adaptation of different data rates.

When the packet data is stored in the FIFOs 88 and 98, the FIFO controllers 86 and 96 generate an interrupt to the slave processors 80 and 90 on a packet unit basis, so that the slave processors 80 and 90 can process the data. Upon receipt of the interrupt, the slave processors 80 and 90 control the FIFO controllers 86 and 96, so that the voice and the facsimile data stored in the FIFOs 88 and 98 are provided to the voice/facsimile codecs 82 and 92 under the control of the FIFO controllers 86 and 96. The corresponding chip of the voice/facsimile codecs 82 and 92 decodes the digital bit stream of the voice and the facsimile data into analog voice and facsimile data, and outputs the converted analog voice and facsimile data to the TDM interface. In the embodiment of the present invention, two slave modules 70 and 72 are implemented by voice/facsimile processing module 60 in which each slave processor 80 (90) in the slave module 70 (72) processes 30 channels, so that the voice/facsimile processing module 60 can service the voice and the facsimile subscribers with 60 channels.

As described above, the novel device can service a maximum number of subscriber ports in designing a voice and facsimile subscriber module for a remote access server, while maintaining a proper load of the module to efficiently operate the system. In addition, when call services and facsimile services are performed through the existing private data network, it is possible to reduce the operating expense by constructing a single-line network and effectively facilitate the management of the system. Accordingly, it is possible to decrease the telephone charge and improve the management expenses.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A device for processing data information in a remote access server which provides a voice and a facsimile data service over the Internet, the device comprising:

a first interface for interfacing with a public switch network;

a second interface for interfacing with the Internet; and, a remote access server coupled to the first interface and the second interface for transmitting the voice and facsimile data received from the first interface to the Internet via the second interface and for transmitting the voice and facsimile data received from the second interface to the public network via the first interface;

said remote access server including;

a plurality of codecs, each having a plurality of channels coupled to said first interface, for encoding/encoding data information received, via said plurality of channel, from said first interface/said second interface;

at least one codec controller for controlling said codecs and for controlling the generation of an interrupt in said codecs;

at least one slave processor for providing the data information from said first interface to one of said channels and outputting said encoded data information by one of said codecs to said second interface upon detecting said interrupt generated from said one codec, and for providing the data information from said second interface to one of said channels and outputting said decoded data information by one of said codecs to said first interface; and, a master processor for communicating with a system operator and for managing the slave processor.

2. The device as claimed in claim 1, further comprising:
a memory means for matching a data rate between the slave processor and the first and second interfaces; and
a memory controller for controlling the memory means.

3. The device as claimed in claim 1, wherein the first interface is coupled to an Integrated Services Digital Network (ISDN).

4. The device as claimed in claim 1, wherein the remote access server comprises at least two slave processors provided for one master processor and each slave processor includes the plurality of the voice/facsimile codecs.

5. The device as claimed in claim 4, wherein the slave processor having a processing capability of about 60 Million Instructions Per second MIPs.

6. A remote access server for processing data information for more than one network device, said apparatus comprising:
a processor;
a first TDM bus coupled to said processor;
a first interface coupled to said first TDM bus for interfacing with a first network;
a packet bus coupled to said processor;
a second interface coupled to said packet bus for interfacing with a second network;
a system operator coupled to said first interface and said second interface via an Inter-Processor Communication (IPC) channel for controlling said interfaces;
wherein said processor includes:
a plurality of codecs, each having a plurality of channels coupled to said first interface, for encoding/decoding data information received, via said plurality of channels, from said first interface/said second interface;
at least one codec controller for controlling said codecs and for controlling the generation of an interrupt in said codecs;
at least one slave processor for providing the data information from said first interface to one of said channels and outputting said encoded data information by one of said codecs to said second interface upon detecting said interrupt generated from said one codec, and for providing the data information from said second interface to one of said channels and outputting said decoded data information by one of said codecs to said first interface; and,
a master processor for communicating with said system operator and for managing said slave processor.

7. The server as claimed in claim 6, wherein said data information comprises voice information and facsimile information.

8. The server as claimed in claim 6, wherein said codecs are voice/facsimile codecs.

9. The server as claimed in claim 6, wherein said first network comprises a public switch network (PSTN).

10. The apparatus as claimed in claim 6, wherein said first network comprises an Integrated Services Digital Network (ISDN).

11. The server as claimed in claim 6, wherein said slave processor having a processing capability of about 60 Million Instructions Per second (MIPs).

12. The server as claimed in claim 1, further comprising a memory means coupled to said processor for matching a data rate between said slave processor and said first and second interfaces; and, a memory controller for controlling said memory means.

13. The server as claimed in claim 12, wherein said memory means comprises a packet FIFO.

14. A remote access server for processing video and data information for more than one network device, said apparatus comprising:
a processor for controlling a plurality of networks;
a first TDM bus coupled to said processor;
a first interface coupled to said first TDM bus for interfacing with an Integrated Services Digital Network (ISDN);
a second TDM bus coupled to said processor;
a second interface coupled to said second bus for interfacing with a public switch network (PSTN);
a packet bus coupled to said processor;
a third interface coupled to said packet bus for interfacing with the Internet network;
a system operator coupled to said first interface, said second interface, and said third interface through an Inter-Processor Communication (IPC) for controlling said interfaces;
said remote access server including;
wherein said processor includes:
a plurality of codecs, each having a plurality of channels coupled to said first interface and said second interface, for encoding/decoding data information received, via said plurality of channel, from said first and second interfaces/said third interface;
at least one codec controller for controlling said codecs and for controlling the generation of an interrupt in said codecs;
at least one slave processor for providing the data information from said first and said second interfaces to one of said channels and outputting said encoded data information by one of said codecs to said third interface upon detecting said interrupt generated from said one codec, and for providing the data information from said third interface to one of said channels and outputting said decoded data information by one of said codecs to said first and said interfaces; and,
a master processor for communicating with said system operator and for managing said slave processor.

15. The server as claimed in claim 14, wherein said data information comprises voice information and facsimile information.

16. The server as claimed in claim 14, wherein said codecs are voice/facsimile codecs.

17. The server as claimed in claim 14, wherein said slave processor having a processing capability of about 60 Million Instructions Per second (MIPs).

18. The server as claimed in claim 14, further comprising:
a memory means for matching a data rate between said slave processor and said first and said second interfaces; and,
a memory controller for controlling said memory means.

19. The server as claimed in claim 18, wherein said memory means comprises a packet FIFO.

* * * * *